United States Patent [19]

Tisne

[11] Patent Number: 4,834,144
[45] Date of Patent: May 30, 1989

[54] WEAVING APPARATUS USING RADIAL AND CONTINUOUS CIRCUMFERENTIAL THREADS

[75] Inventor: Jean-Louis Tisne, Martiguas, France

[73] Assignee: Aerospatiale Societe Nationale Industrielle, Paris, France

[21] Appl. No.: 129,623

[22] Filed: Dec. 7, 1987

[30] Foreign Application Priority Data

Dec. 8, 1986 [FR] France .................. 86 17120

[51] Int. Cl.$^4$ ........................................... D03D 37/00
[52] U.S. Cl. ................................................ 139/13 R
[58] Field of Search ............... 139/13 R, 16, 387 R

[56] References Cited

U.S. PATENT DOCUMENTS

| | | | |
|---|---|---|---|
| 2,737,207 | 3/1956 | Lariviere | 139/13 R |
| 4,316,488 | 2/1982 | Manini et al. | 139/13 R |
| 4,346,741 | 8/1982 | Banos et al. | 139/387 R |
| 4,579,149 | 4/1986 | Huemer | 139/13 R |

FOREIGN PATENT DOCUMENTS

| | | | |
|---|---|---|---|
| 2490687 | 3/1982 | France . | |
| 2047756 | 12/1980 | United Kingdom | 139/13 R |

*Primary Examiner*—Andrew M. Falik
*Attorney, Agent, or Firm*—Armstrong, Nikaido, Marmelstein, Kubovcik & Murray

[57] ABSTRACT

A machine for weaving fibers of glass, Kevlar, carbon and the like including a rotary assembly with two plates defining therebetween a weaving chamber. The lower plate has sliding fingers at its periphery and the upper plate has fixed fingers in line with the sliding fingers occupying positions where they are moved away from each other in at least one sector of the support frame and positions in which they are in contact with each other in at least another sector of the support frame for forming continuous columns enclosing the weaving chamber. The fingers serve as support for the radial threads. Hooking platelets are provided on the periphery of the support frame for ensuring movement of the sliding fingers perpendicularly to the lower plate, and movement of the platelets on said fingers as a function of their position with respect to the support frame.

12 Claims, 8 Drawing Sheets

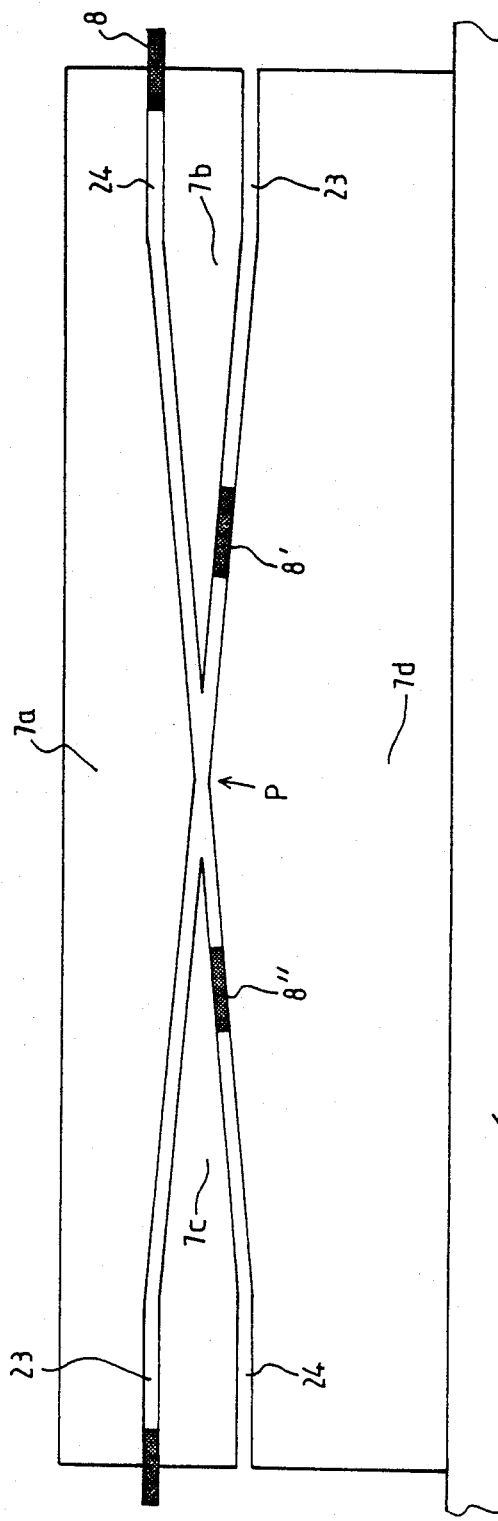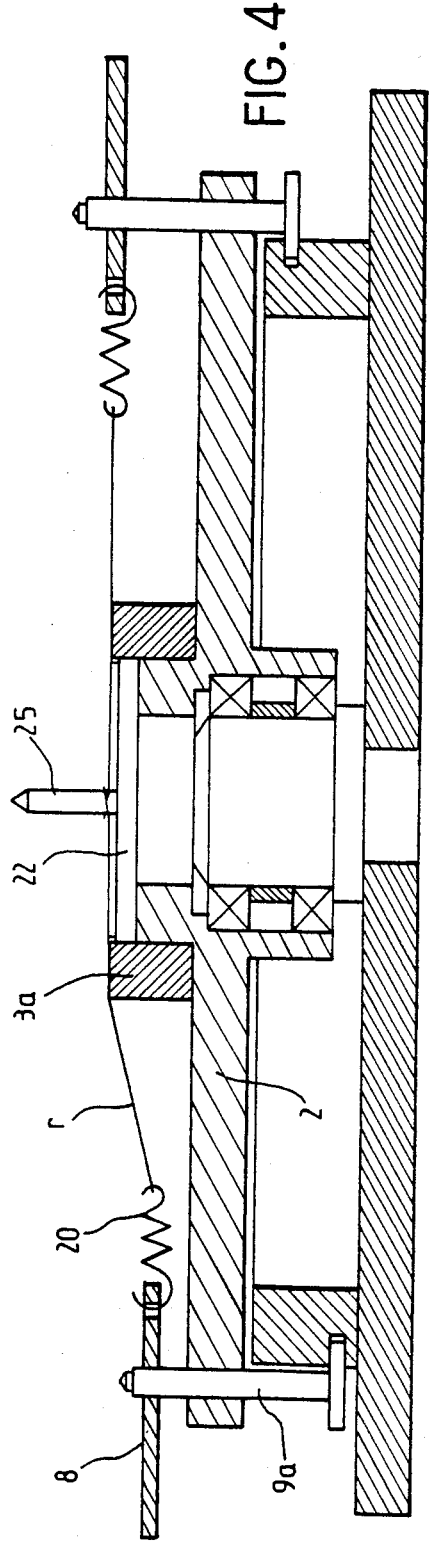

WEAVING APPARATUS USING RADIAL AND CONTINUOUS CIRCUMFERENTIAL THREADS

BACKGROUND OF THE INVENTION

The invention relates to a method for manufacturing polar reinforcements formed more particularly of glass, Kevlar, carbon . . . fibers preimpregnated or not with thermoplastic or thermosetting resins and having continuous circumferential threads and radial threads as well as a weaving machine for implementing the method.

In the field of wound impeller casins, which as is known are subjected to local stresses, the structures should be reinforced particularly around an area surrounding a single point of reference such as a pole (hereinafter referred to as a polar zone). For that, disks may be placed in the polar zone formed of spirally wound threads or the bottom of the structure may be reinforced by an interrupted additional polar or satellite winding, partly cylindrical.

The term "disk" designates a reinforcement formed of threads disposed only circumferentially by spiral winding between two plates.

Another technique consists in forming such a reinforcement with a "spiralled fabric". This weaving is carried out on a loom having a conical warp thread feed roll, which causes the formation of a fabric which is wound up on a cone or on its shape developed in a plane, the ring. The circumferential threads are not continuous and overlapping is necessary for passing the tractive forces in the circumferential threads by interlayer shearing.

A technique is moreover known which consists in forming three dimensional disks by winding circumferential threads in channels formed by radially disposed composite rods, then by transversally consolidating by means of threads parallel to the generatrices. Or according to another technique the circumferential and radial threads may be disposed in channels formed by rods disposed parallel to the generatrices, then replacing the metal rods by threads by "lacing". These latter two solutions provide a product which is too thick to be suitable for polar reinforcements integrated between coiled layers.

To form a single layer reinforcement, it has been suggested to form seams on a network of radial threads. For that, the radial threads are disposed between pins supported by a tool and the circumferential threads are sewn spirally. The stitch is such that reinforcing threads disposed in the spool of the sewing machine are joined to the circumferential threads by a binding thread of low mass, made for example from nylon. Now it has discovered that the sewing and the resulting seam displace the radial threads; it is consequently difficult to adjust the parameters such as the length of the stitches or the tension of the threads so as to obtain a straight reinforcement thread. Furthermore, the thread tends to pack the path of the spool. Thus, this technology which seems simple at first sight requires considerable adjusting for results which risk not being satisfactory, in particular in so far as the positioning of the radial threads and the integrity of the circumferential threads are concerned.

U.S. Pat. No. 4,346,741 describes three dimensional woven bodies of revolution in which circumferential yarns and radial yarns are laid in helical courses. French Pat. No. 2,490,687 discloses a fabric and a process for wrapping a thread on a truncated roller using non-continuous circumferential threads. Fabrics obtained are tubular woven pieces with a constant diameter.

SUMMARY OF THE INVENTION

So as to avoid the drawbacks inherent in these different techniques, the invention proposes forming a textile article by weaving on threads and more precisely polar reinforcements by radial threads and continuous circumferential threads, by means of a method in which radial threads are stretched between a hub and alternately one or another of two superimposed plates thus forming a space in which the circumferential thread is wound, reversal of each radial thread from one plate to the other being provided at each revolution.

Another object of the present invention consists then of a machine for weaving polar reinforcements formed of radial threads and continuous circumferential threads for implementing the method, which machine includes a rotary assembly with two parallel plates mounted on a support frame and driven by a motor in which the plates define a weaving chamber therebetween, the lower plate of which has sliding fingers on its periphery and the upper plate of which has fingers fixed in line with the sliding fingers, which fingers occupy positions in which they are moved away from each other in at least one sector of the support frame and positions in contact with each other in at least another sector of the support frame for forming continuous columns closing the weaving chamber.

In accordance with the main characteristic of the invention, the fingers serve as support for platelets for fastening the radial threads, and means are provided on the periphery of the support frame for ensuring movement of the sliding fingers perpendicularly to the plate, and the movement of the platelets on said fingers as a function of their position with respect to the support frame.

In accordance with another main characteristic of the invention, the means ensuring movement of the sliding fingers perpendicularly to the plate are formed by a ramp provided on the periphery of a fixed ring integral with the support frame, and a head integral with each sliding finger which is engaged in said ramp and controls the vertical movement of the fingers as a function of their rotation with respect to said frame and it is arranged for the ramp to be horizontal in a low position in a given sector of the support frame, to be horizontal in a high position in another sector disposed facing the first one, to be inclined ascending from the low position towards the high position in a first intermediate sector and to be inclined descending from the high position to the low position in a second intermediate sector.

In a particular characteristic of the invention, at least one ring serving for fastening the radial and circumferential threads is provided about the sleeve of the upper plate and rotates with the plates, the ring being formed of two superimposed half rings fixed to each other and between which the radial threads and the circumferential thread are nipped or having an upper profiled face with a certain slant corresponding to the slant of the desired woven cone and sliding along the sleeve of the upper plate.

In accordance with another characteristic of the invention, the means for ensuring movement of the platelets on the fingers is formed of a vertical routing plate extending in a sector of the support frame and fixed to said frame externally of said ramp and cooperating with the outer end of said platelets, said routing plate being formed of a lower part whose upper cut out has two sections slanted slightly upwardly meeting at a central point, an upper part whose lower cut-out has two slightly downward slanted sections and two lateral triangular parts whose slides are parallel to the slanting sections of the lower and upper parts, these parts being slightly spaced apart so as to form two indentations which extend from one end of the plate to the opposite end after crossing at the central point, and form guide grooves for the platelets.

BRIEF DESCRIPTION OF THE DRAWINGS

Other particular features and advantages of the invention will be clear from reading the following description of embodiments, with reference to the accompanying drawings which show:

FIG. 3: a developed plane view of the routing plate of the machine,

FIG. 4: a central sectional view of the lower part of the machine,

DESCRIPTION OF THE PREFERRED EMBODIMENTS

Figure 1:
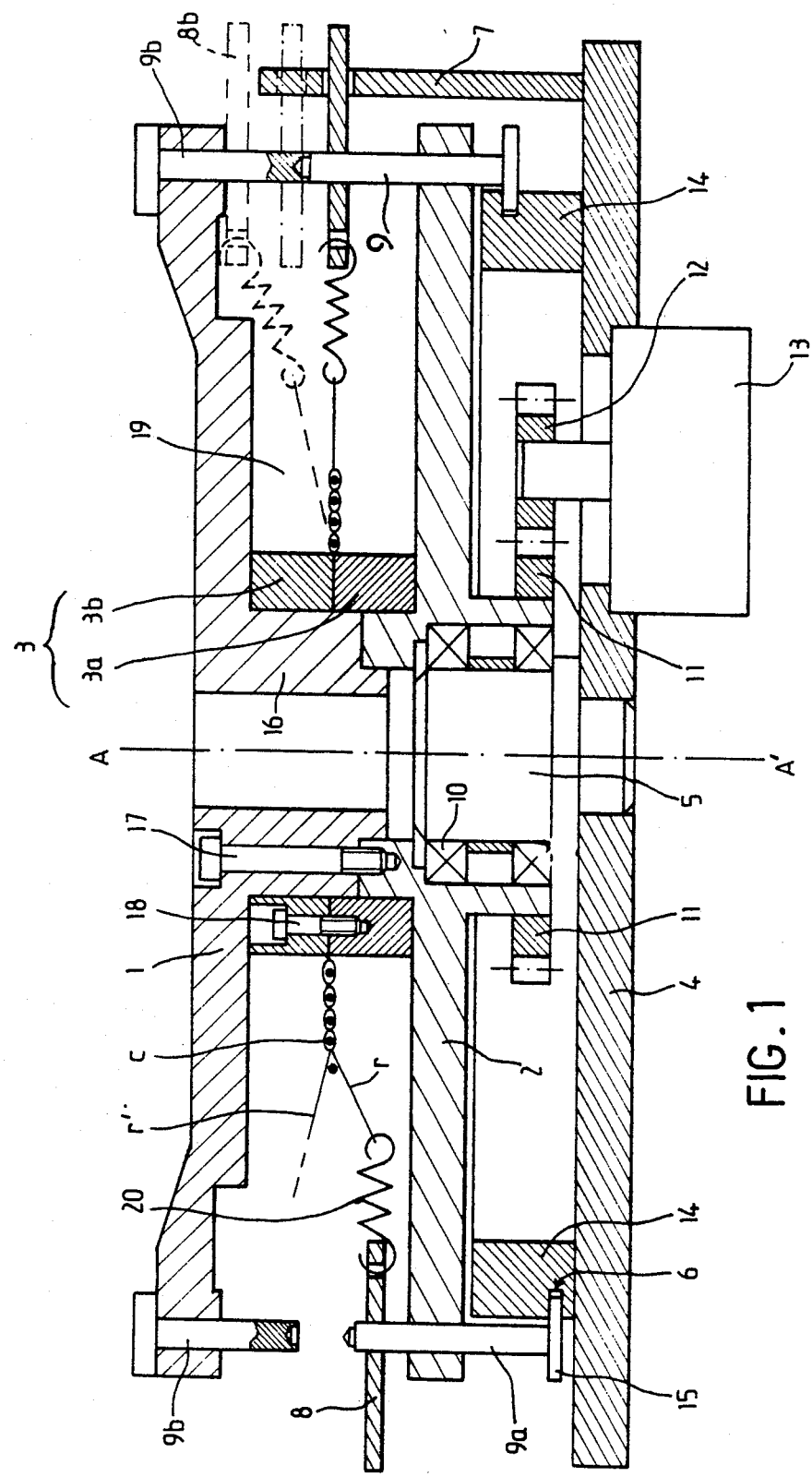
FIG. 1: a cross-sectional view of the machine according to the invention.
Figure 2:
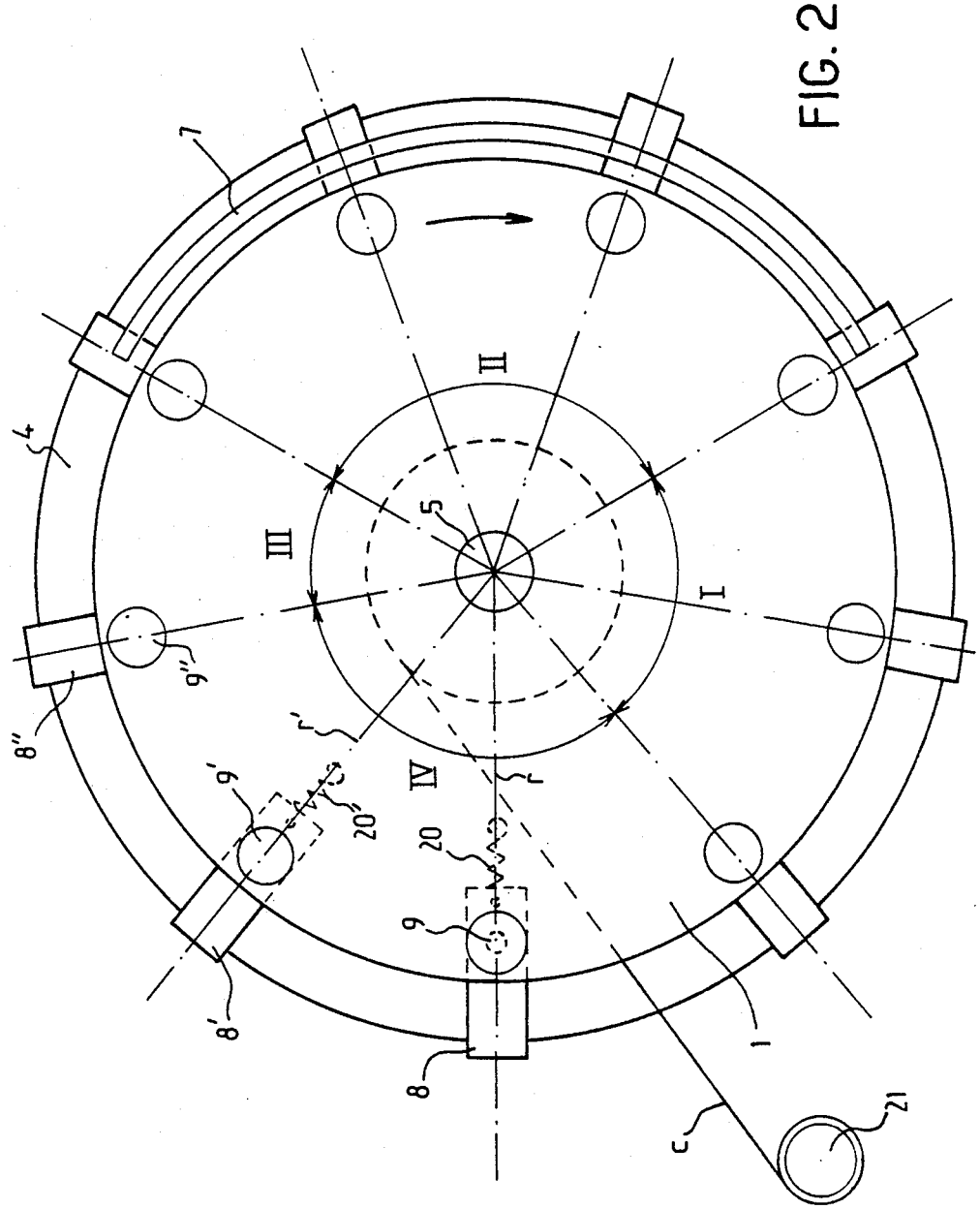
FIG. 2: a top view of the machine.

Referring more precisely to FIGS. 1 and 2, it can be seen that the weaving machine comprises essentially a support frame 4 above which an upper plate 1 and a lower plate 2 are mounted parallel to one another and form cheeks which may rotate about a vertical axis AA'. The lower plate 2 rests on a centering rivet 5 through bearings 10. A ring gear 11 integral with the plate meshes with a drive pulley 12 driven by a motor 13. A fixed ring 14, of a diameter slightly less than that of the plates, is secured to frame 4 and has on its external face and over the whole of its periphery a ramp 6. The lower plate 2 is pierced at its periphery and at even intervals with orifices for the passage of mobile fingers 9a which slide vertically and are provided at their lower end with heads 15 which are engaged in the ramp 6 of ring 14.

The upper plate 1 has the form of a disk whose central part 16 in the form of a sleeve rests on the lower plate 2 to which it is fixed by a set of screws 17. A ring 3, itself formed of two superimposed half rings 3a and 3b, surrounds sleeve 16 between the two plates. The two half rings are also fixed to each other by a set of screws 18.

With the plate-ring assembly thus fixed together, it is rotated by motor 13. The annular space between the lower face of the upper plate 1, sleeve 16 and the upper face of the lower plate 2 forms the weaving chamber 19 inside which the threads to be woven are placed. Radial threads are nipped between the two rings 3a and 3b and connected to peripheral platelets 8 through tension springs 20 fixed at their ends. These platelets are each formed with an orifice by which they are fitted either on mobile fingers 9a of the lower plate 2 or on fixed fingers 9b provided at the periphery of the upper plate 1. The fixed fingers 9b are oriented downwards and are located opposite the mobile fingers 9a. On the periphery of support frame 4 and over the whole length of an angular sector II is fixed a vertical routing plate 7 whose structure is shown in a plane view in FIG. 3. This plate is formed first of all by a lower part 7d whose base is fixed to frame 4 along sector II and whose upper cut out has two slightly upwardly inclined sections meeting at a central point P. Plate 7 is also formed of an upper part 7a whose lower cut-out has two slightly downward inclined sections, and two lateral triangular parts 7b and 7c whose points are oriented towards point P and whose sides are parallel to the inclined sections of parts 7a and 7d. The elements 7a, 7b and 7c of plate 7 are held in the position shown in FIG. 3 by supports, not shown. They are moved apart from each other so as to form with elements 7d two indentations 23 and 24 which extend from one end of plate 7 to the opposite end after crossing at the central point P. These indentations form guide grooves for the end of platelets 8. It will be noted particularly in FIG. 2 that the support frame is divided into four sectors: I, II, III, IV. A circumferential thread C fed from a reel 21 is also nipped between rings 3a and 3b and penetrates into the machine in sector IV. For the sake of clarity, only a certain number of platelets 8, 8', 8'', etc . . . have been shown in FIG. 2.

Before starting up the machine, the radial threads need to be positioned. This operation takes place before fixing the upper plate 1 on the lower plate 2.

Figure 5:
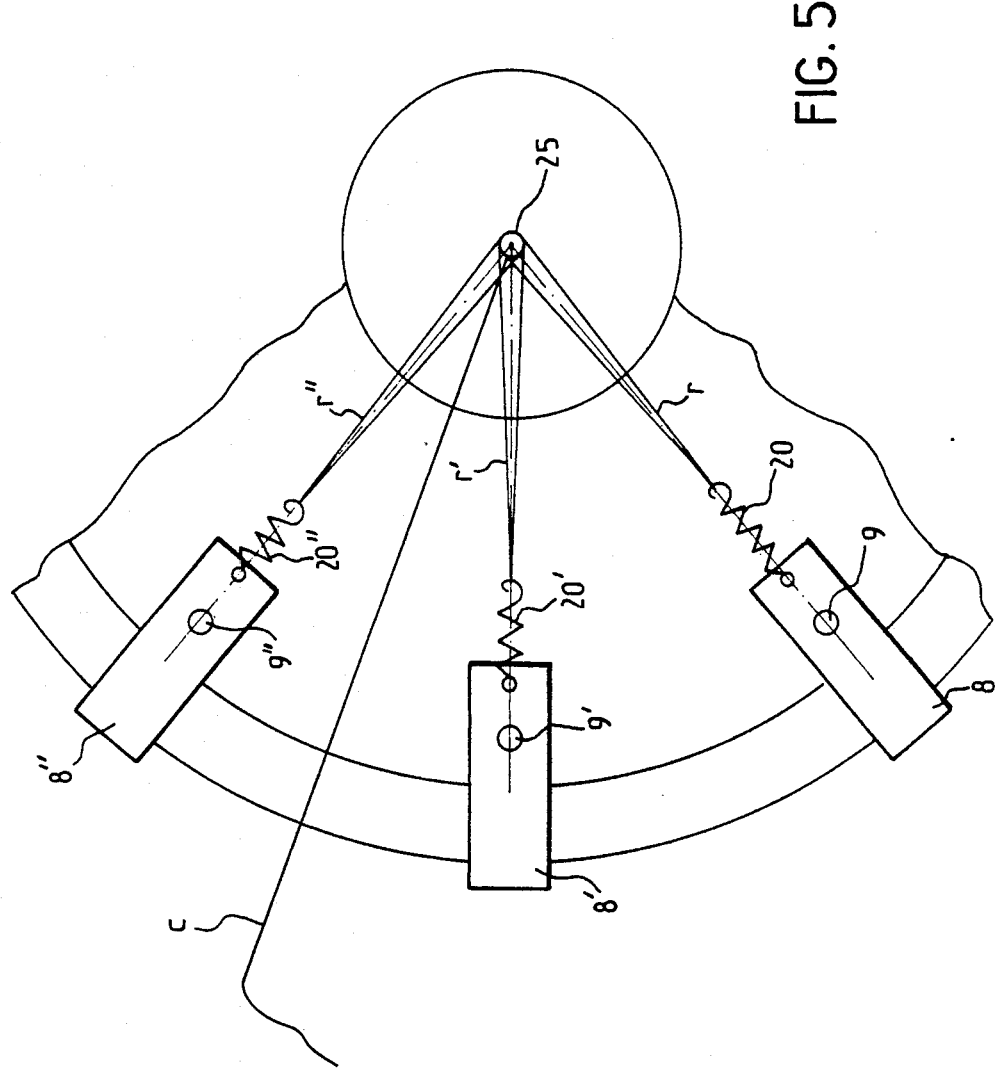
FIG. 5: a top view of a part of the machine of FIG. 2.

Referring to FIG. 4, it can be seen that the half ring 3a is in position on the lower plate 2. A central piece 22 having a point 25 is placed on this plate at the center thereof and is oriented upwardly. The radial threads R are stretched between point 25 and the spring 20 of a platelet 8 previously engaged on a finger 9a. So as to simplify this operation and make automation thereof possible, a continuous thread may, as shown in FIG. 5, be fixed to the point, then hooked onto the spring 20, then brought back to point 25 about which it is wound before being hooked onto the spring 20' of the adjacent platelet 8' and coming back to the point . . . etc . . . until said thread R has gone right round the plate. Thus, for each platelet 8, there are two radial threads r leading towards the center. If required, to facilitate this operation, the routing plate 7 is removed. The circumferential thread C is also fixed to point 25 and extends radially in the direction of reel 21.

With the threads thus stretched, the upper half ring 3b is placed on the lower half ring 3a and is tightened by means of screws 18. The threads (r and c) are thus nipped by the rings thus making it possible to cut them to the inner diameter thereof. Then piece 22 is removed and the upper plate 1 laid on the lower plate 2 to which it is fixed by screws 17 (FIG. 1). The platelets 8, 8', 8'' are positioned alternately on fingers 9a and fingers 9b. The tension exerted by springs 20 makes it possible to hold them on the fingers at the height where they are initially positioned. The circumferential thread c is then placed tangentially to the outer diameter of ring 3 and the routing plates 7 are refitted on frame 4.

Figure 7:
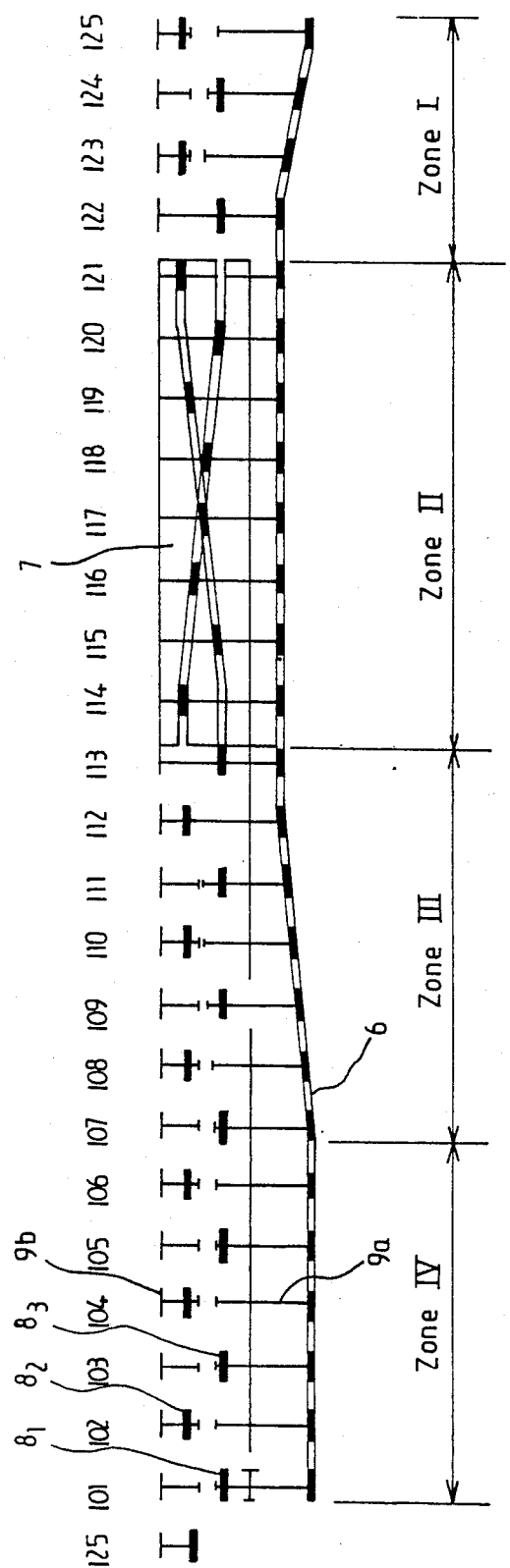
FIG. 7: a plane view showing the evolute of the reversal mechanism.

The machine is ready to operate. The fixed ramp 6 sets the height of the mobile fingers 9a by means of heads 15. FIG. 1 shows a finger 9a, on the left in the low position and on the right in the high position in which its end comes into abutment against the corresponding fixed finger 9b, thus forming a continuous column 9. Ramp 6 is horizontal in the low position in zone IV of the frame, horizontal in the top position in zone II opposite zone IV, slanted ascending from the low position to the high position in zone III, and slanted descending from the high position to the low position in zone I as shown in FIG. 7.

At the time of starting up the machine, the circumferential thread c is stretched between reel 21 and rings 3 and is engaged between the thread r hooked onto platelet 8 in the low position and thread r' hooked onto platelet 8' in the high position (see FIGS. 1 and 2). When the motor 13 rotates the plates 1 and 2, the circumferential thread c unwinds from reel 21 and then is wound about two adjacent radial threads. This operation takes place in zone IV where the two fingers 9a and 9b are moved apart from each other, which allows the passage of the circumferential thread. In zone III, where the ramp 6 ascends, fingers 9a are raised under the action of the head 15. In zone II, the fingers 9a and 9b are in abutment and form a smooth continuous column on which the platelets 8 may slide from bottom to top and from top to bottom, their orifices being provided on fingers 9 with a slight clearance. In zone II, said platelets 8 ride in the guide grooves 23 and 24 of the routing plate 7 and are appropriately moved vertically. It can be seen that the platelets arriving in the top position are moved towards a low position and conversely the platelets arriving in the low position are moved towards a high position. The high and low platelets being offset angularly on the plate will arrive in an offset position at point P and will cross it without a risk of clashing (FIG. 3). The clearance between the fingers and the platelets or else an oblong hole formed in each platelet will make it possible for these latter to be inclined in the sloping part of the routing plate.

Figure 6:
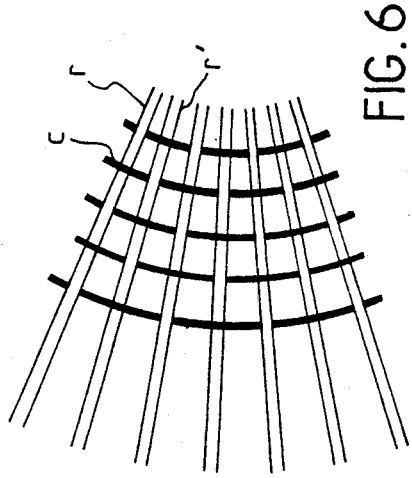
FIGS. 6 and 10: two partial views of weaving patterns obtained.

This reversal of vertical position of the platelet causes reversal of the radial threads r—r', the top thread passing downwards and conversely. That means that the circumferential thread c will be wound between two bundles of radial threads as can be seen more precisely in FIG. 1. It will be noted that the tension of the circumferential thread is adjusted so as to position this thread correctly and to determine the packing of the preceding windings. The weave obtained is then of the taffeta type such as shown in FIG. 6.

Finally, in zone I, where the ramp 6 descends, fingers 9a come back to the low position.

FIG. 7 shows the evolute of the reversal mechanism for 25 platelets numbered from 101 to 125, showing the profile of the ramp 6 in the four zones, the corresponding position of fingers 9a and 9b as well as the position of the routing plate 7.

Figure 8:
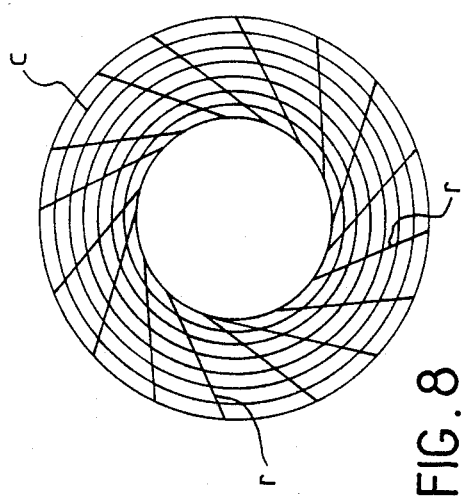
FIGS. 8 and 9: two views of fabrics obtained using the machine.

In variants of embodiment, weaves can be obtained whose radial threads r are slanted from the radial position to the tangential position as shown in FIG. 8. This is obtained after positioning the radial threads, by offsetting ring 3 by the desired angle with respect to the plate. Each spring 20 then takes up the difference of length between the two positions.

Figure 9:
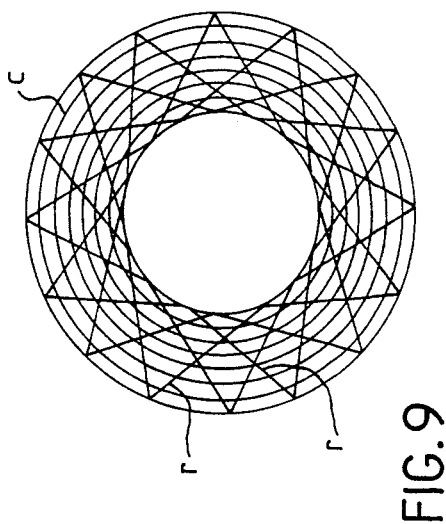

When two identical fabrics each as shown in FIG. 8 are superimposed, as with one of them being turned over, a fabric is obtained with symmetric reinforcement as shown in the variant of FIG. 9.

Figure 10:
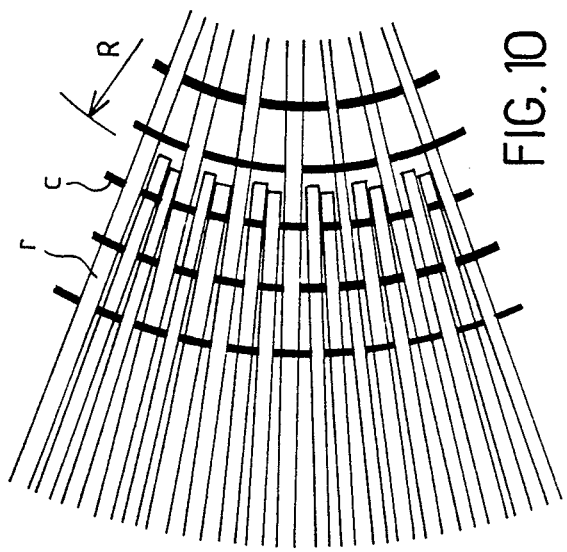

Furthermore, it may be interesting to obtain a fabric with substantially constant filling, compensating for the fact that the space between two adjacent radial threads increases also with the radius. For that, radial threads must be added when the space becomes equal for example to the width of two threads, as shown in FIG. 10. This operation may be carried out by preparing the machine with the total number of radial threads, but by arranging for some of them not to take part immediately in the weaving before the weaving has reached a certain radius R. For that, a certain number of platelets 8b are mounted right at the top part of the fixed finger 9b as shown with broken lines in FIG. 1. They thus escape the action of the routing plate 7 and take no part in the weaving. A mechanism not shown places them back in a normal position when the weaving has reached radius R and all of the radial threads are then involved in the weaving.

Figure 11:
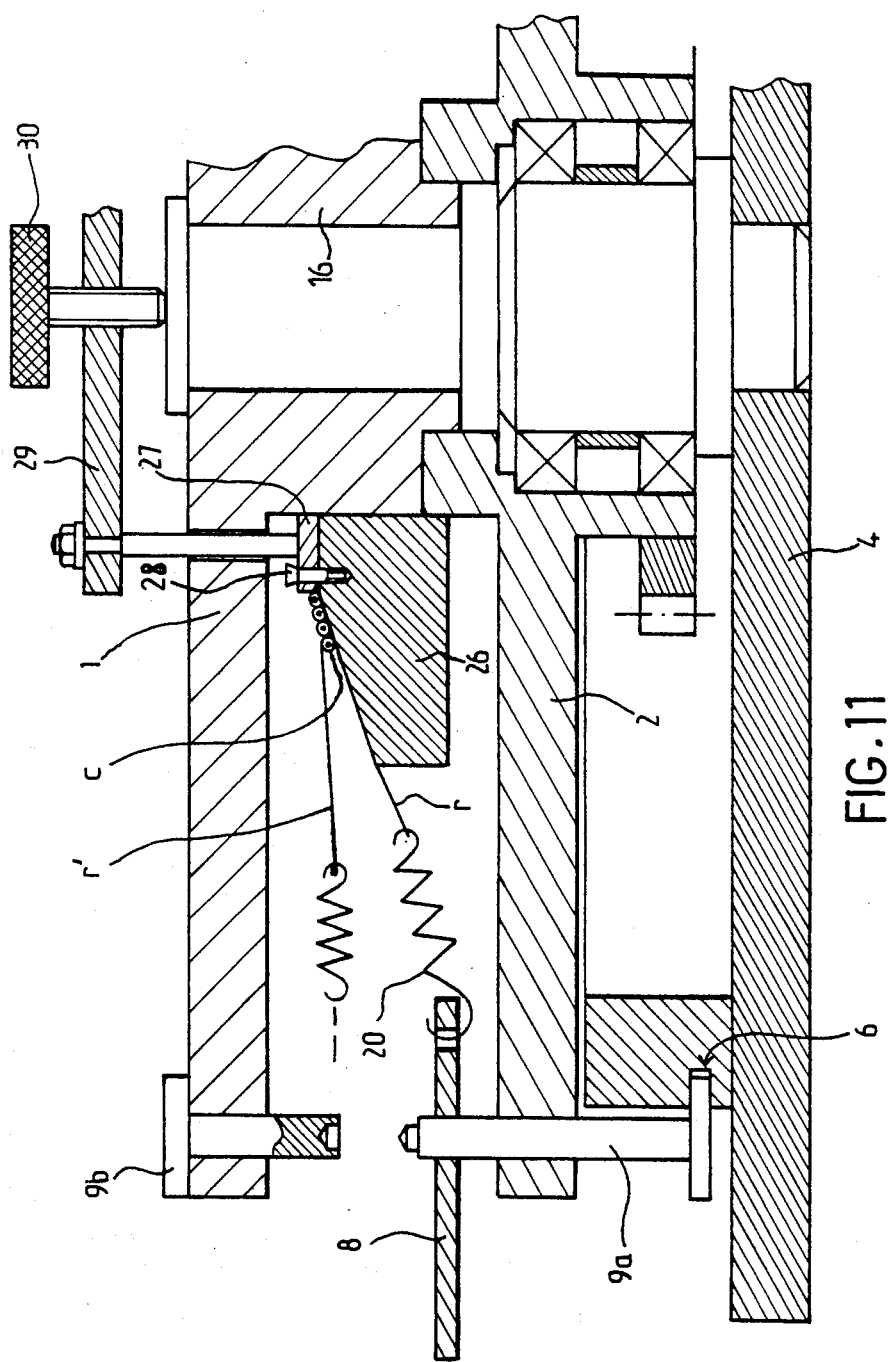
FIG. 11: a partial central cross-sectional view of a second embodiment of the machine.

To obtain a cone shaped or dome shaped weave instead of a flat weave as described above, the assembly shown in FIG. 11 is used. Instead of ring 3, a special ring 26 is provided whose upper face is profiled and has a certain slant corresponding to the slant of the desired woven cone. This ring is fixed to an annulus 27 by a set of screws 28, threads r and c being nipped between the two. Annulus 27 is itself fixed to a stirrup 29 which is adjustable in height by means of a knurled wheel 30. Said wheel makes it possible to adjust the height of ring 26 with respect to plates 1 and 2, as the weaving progresses, so that the weaving follows the slope of the ring. So that the weaving is applied on this shape, the tension of the lower threads r will be greater than that of the upper threads, because of a greater length so a greater tractive force is exerted by spring 20 on the lower threads.

Figure 12:
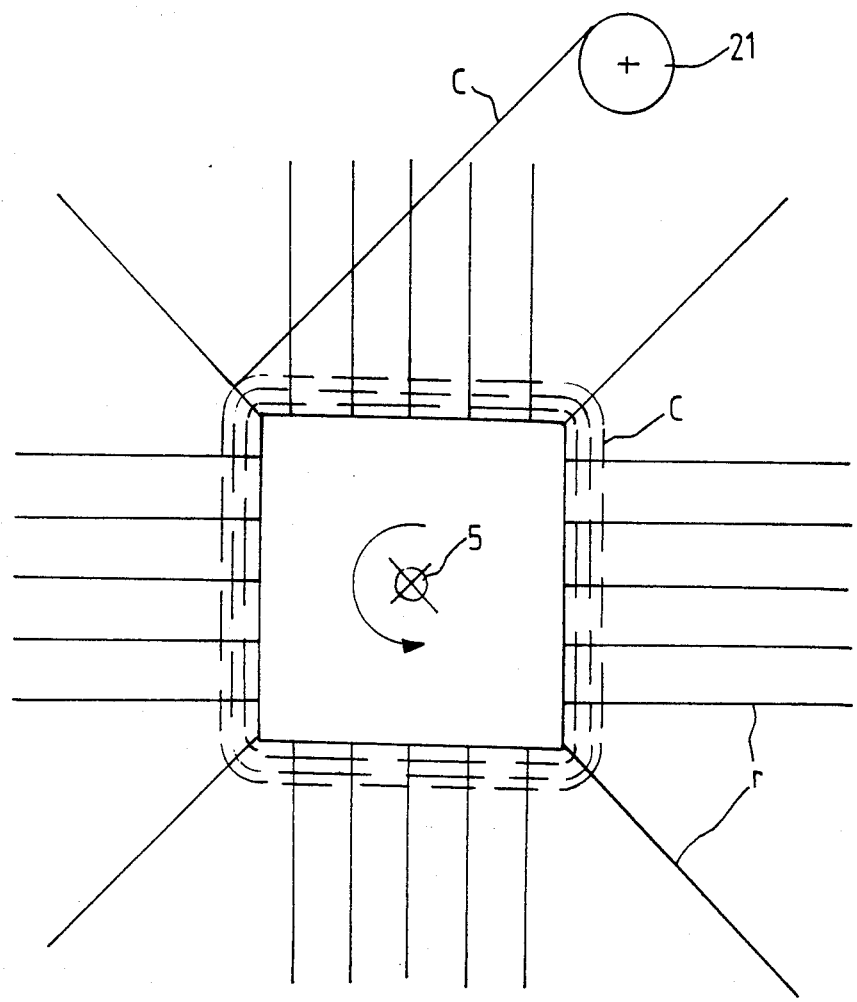
FIG. 12: a partial view of a particular weaving pattern which can be obtained with the machine of the invention.

Finally, it will be readily understood that it would be possible to form reinforcements such, for example, as the one shown in FIG. 12 by adapting the machine and more particularly rings 3a, 3b, 26, 27 to the shape of the desired reinforcement.

What is claimed is:

1. A machine for weaving radial threads and continuous circumferential threads comprising a rotary assembly with two parallel plates mounted on a support frame and driven by a motor, in which said plates define a weaving chamber therebetween, the lower plate of which has sliding fingers on its periphery and the upper plate of which has fingers fixed in line with the sliding fingers, which fingers occupy positions in which they are moved away from each other in at least a first sector of the support frame and positions in contact with each other in at least a second sector of the support frame for forming continuous columns closing the weaving chamber as the plates carrying the fingers rotate, said fingers serve as support for platelets for fastening the radial threads, and means are provided on the periphery of the support frame for causing vertical movement of the sliding fingers perpendicularly to the plate, and for causing movement of the platelets on said fingers as a function of their position with respect to the support frame.

2. The weaving machine as claimed in claim 1, wherein said means for causing vertical movement of the sliding fingers perpendicularly to the plate are formed by a ramp provided on the periphery of a fixed ring integral with the support frame, and a head integral with each sliding finger which is engaged in said ramp and controls the vertical movements of the fingers as a function of their circumferential position with respect to said frame.

3. The weaving machine as claimed in claim 2, wherein said ramp is horizontal in a low position in said first sector of the support frame, is horizontal in a high position in said second sector disposed facing the first sector, is inclined ascending from the low position towards the high position in an intermediate third sector and is inclined descending from the high position to the low position in an intermediate fourth sector.

4. The weaving machine as claimed in claim 3 wherein said means for causing movement of the platelets on the fingers is formed of a vertical routing plate extending in said second sector of the support frame and fixed to said frame externally of the ramp and cooperating with an outer end of each of said platelets.

5. The weaving machine as claimed in claim 4, wherein said routing plate being formed of a lower part having an upper cut-out with two sections slated slightly upwardly meeting at a central point, an upper part having a lower cut-out with two slightly downward slanted sections, and two lateral triangular parts having sides parallel to the slanting sections of said lower and upper parts, these parts being slightly spaced apart so as to form two indentations which extend from one end of the plate to the opposite end after crossing at the central point, and form guide grooves for the platelets.

6. The weaving machine as claimed in one of claims 1 or 4, wherein certain platelets are mounted right at the top of the fingers where they escape from the routing action during a first portion of the weaving in which they play no part, while awaiting to be put back in the normal position for taking part in a second portion of the weaving.

7. The weaving machine as claimed in claim 1, where said upper plate has a sleeve and at least one ring serving for fastening the radial and circumferential threads is provided about the sleeve of the upper plate and rotates with said plates.

8. The weaving machine as claimed in claim 7, wherein said ring is formed of two superimposed half rings fixed to each other and between which the radial threads and circumferential threads are nipped.

9. The weaving machine as claimed in claim 7, wherein the ring has an upper profiled face with a certain slant corresponding to the slant of a desired woven cone and it slides along the sleeve of the upper plate.

10. The weaving machine as claimed in one of claims 7 or 9, wherein an annulus is fixed to said ring for nipping radial and circumferential threads and said annulus is adjustable in height with respect to the upper plate.

11. The weaving machine as claimed in claim 1, wherein the platelets are formed with an orifice by which they are engaged on the fingers and their ends penetrating inside the weaving chamber are provided with tensioning members for hooking the radial threads.

12. The weaving machine as claimed in one of claims 1 or 11, wherein said platelets are engaged alternately on the lower sliding fingers and on the upper fixed fingers.

* * * * *